Feb. 25, 1964 F. M. HAGMANN ETAL 3,121,913
APPARATUS FOR PRESSURE FORMING PLASTICS
Filed May 8, 1961 2 Sheets-Sheet 1
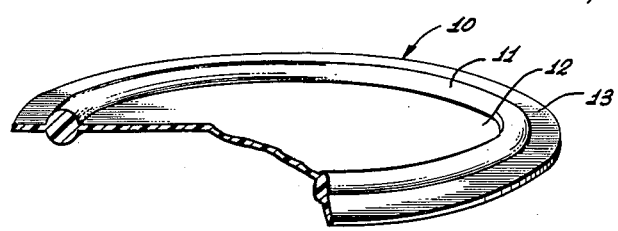
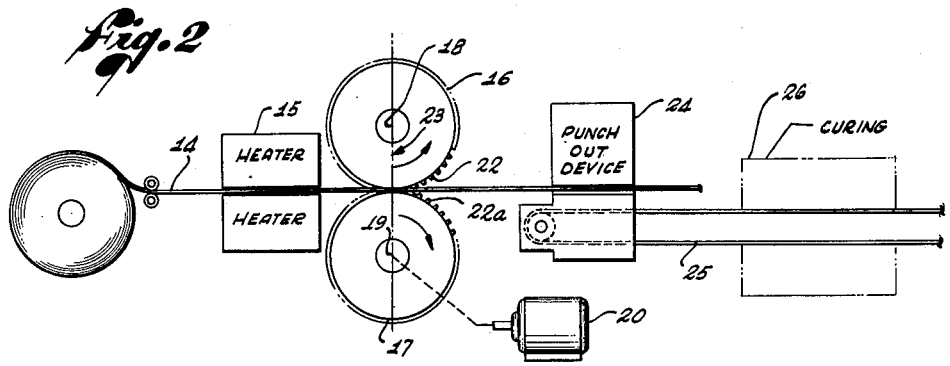
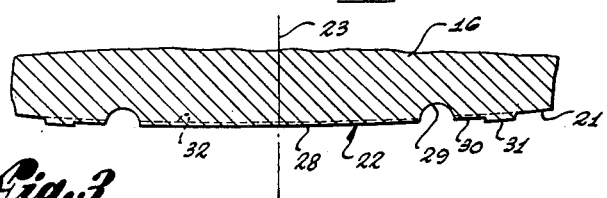
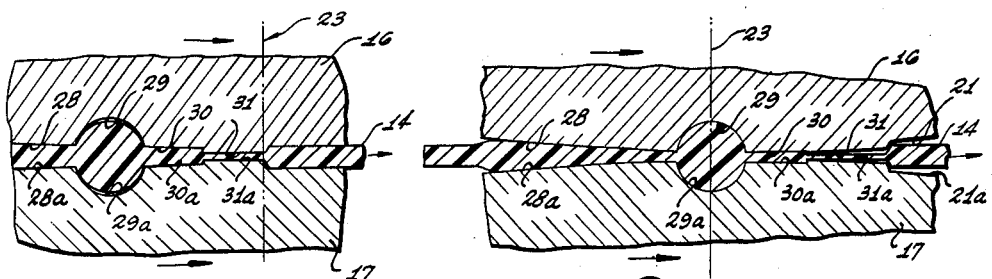
INVENTORS
FOSTER M. HAGMANN
HAZEN B. GRAHAM
BY ROBERT B. MORRIS
Fulwider Mattingly & Huntley
Attorneys Feb. 25, 1964    F. M. HAGMANN ETAL    3,121,913
APPARATUS FOR PRESSURE FORMING PLASTICS
Filed May 8, 1961    2 Sheets-Sheet 2
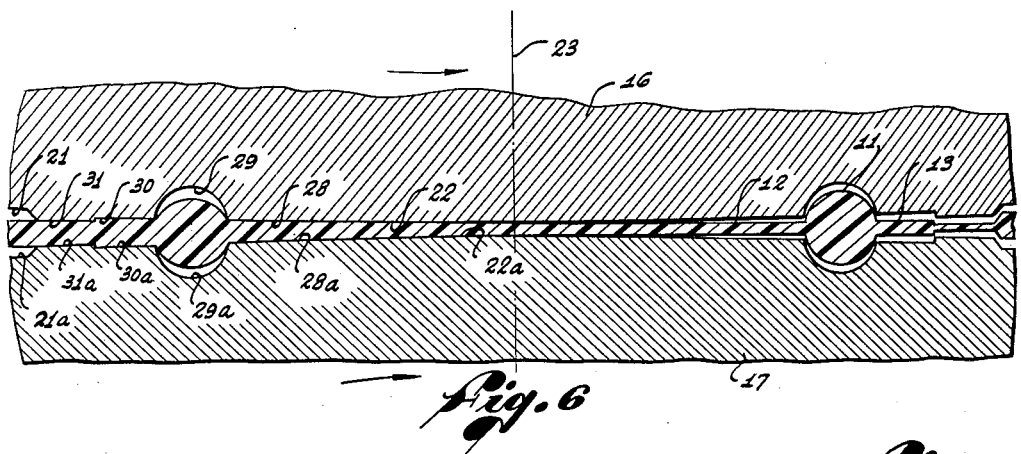
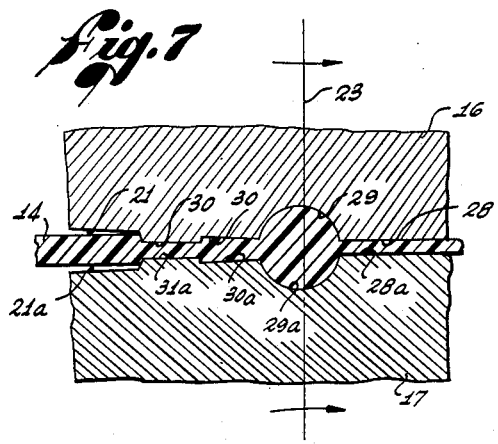
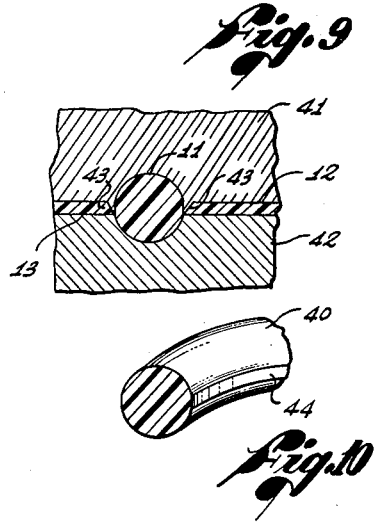
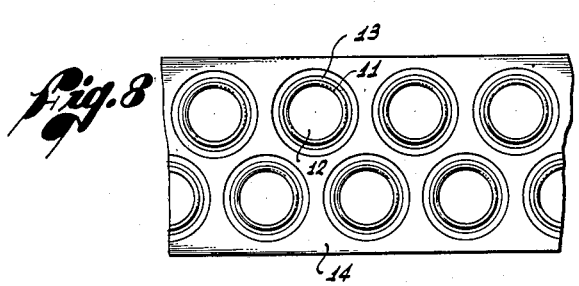
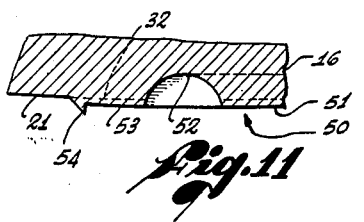
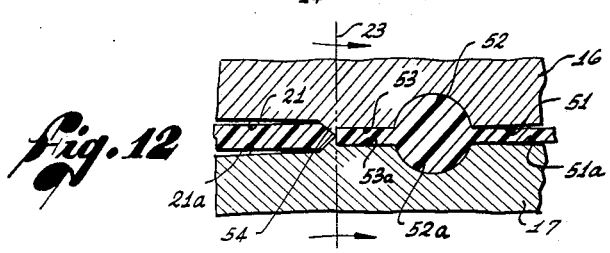
INVENTORS
FOSTER M. HAGMANN
HAZEN B. GRAHAM
BY ROBERT B. MORRIS
Attorneys

United States Patent Office 3,121,913
Patented Feb. 25, 1964

3,121,913
APPARATUS FOR PRESSURE FORMING
PLASTICS
Foster M. Hagmann, 1001 3rd St., Santa Monica, Calif.;
Hazen B. Graham, 746 Cory Drive, Inglewood 3, Calif.;
and Robert B. Morris, 20616 Quedo Drive, Woodland
Hills, Calif.; said Graham and said Morris assignors of
fourteen and two-thirds percent to said Hagmann, and
of fourteen percent to Wanda L. Pratt, Santa Monica,
Calif.
Filed May 8, 1961, Ser. No. 108,512
4 Claims. (Cl. 18—10)

This invention relates broadly to apparatus for shaping or forming plastics and, more particularly, to novel apparatus wherein cooperating rollers are used to continuously pressure form plastics.

The novel apparatus of the present invention finds a highly useful application in connection with forming O-ring type sealing-lining elements which are adapted for use with container sealing closures. One such sealing-lining element is illustrated in FIGURE 1, this form and modifications thereof having been disclosed in our copending applications as follows: Seal, Serial No. 61,749, filed October 10, 1960, which, in turn, is a continuation-in-part of our application Seal, Serial No. 14,707, filed March 14, 1960, now Patent No. 3,055,517.

Sealing closures embodying these sealing-lining elements are highly desirable from the standpoint of providing a highly effective and durable seal, and also from the standpoint of providing a noncorrosive and noncontaminating liner for the metal closure member. For this reason, the present invention will be described in detail as especially adapted for this application. However, it will be understood that there are numerous other equally useful applications, and the detailed description of this one is not intended to be limitative.

We have found that by feeding plastic sheet material between a pair of spaced apart rollers carrying cooperating dies, it is possible to continuously and economically mass produce the sealing-lining elements. In essence, the present apparatus performs a type of pressure forming wherein plastic material is shifted in position, so as to reduce the material thickness of the stock in a given area (liner) and increase its thickness in an adjacent area (O-ring). The plastic may be thought of as building up on the upstream side of the rollers so as to afford ample material for the formation of the relatively thick O-ring portion of the sealing-lining element.

The broad group of plastics termed thermoplastics readily lend themselves to formation or shaping by the method of the invention. A characteristic of thermoplastics is that they may be softened by heat and shaped or formed, and, when cooled, they retain their new shape. Furthermore, the process may be repeated over and over again without affecting the physical properties of the material. For example, certain thermoplastics, such as polyethylene and vinyl, are normally resilient, deformable and substantially incompressible, making them especially well adapted for sealing applications. When these materials are heated to approximately 250° F., they soften and may be shaped as by the present method, and, upon cooling, they retain that shape but regain their desirable physical properties. Thus, when forming sealing-lining elements with the present apparatus from thermoplastic sheet material, it is first necessary to preheat the material. The heated material is then fed between rollers in a continuous operation where forming or shaping takes place. In effect, the finished product comes out of the rollers, and upon sufficient cooling is ready for use. Any scrap material may be ground up and reused in extruding additional sheet material.

A somewhat different situation is encountered when forming plastics of the group termed thermosets or thermosetting plastics. For the purposes of the present discussion, rubber is considered to be in this group. Most thermosets, such as rubber, are originally in a soft or workable state, and must be cured under heat, as the name implies, before they take on physical properties enabling them to be used satisfactorily in applications such as the illustrative sealing-lining element. Depending upon the characteristics of the particular material, it is sometimes desirable to preheat the material in order to make it more workable. The extent of preheating, of course, must be considerably less than the heating required to cure the material.

Thus, when forming sealing-lining elements by the present method from thermosetting plastic sheet material, the sheet is either fed between the rollers at room temperature, or preheated slightly, and then fed between the rollers. The forming or shaping operation is accomplished continuously in the same manner as in the case of the thermoplastic material. The basic difference between the present operation and that previously described is that the elements formed of thermosetting material must be cured subsequent to the forming operation. This curing may be accomplished in any suitable manner, as, for instance, in curing ovens, or the like.

We have found that the apparatus of the invention also may be used to advantage in forming O-rings per se. Depending upon the type of material used, the initial phase of the process is identical to one or the other of the processes described in connection with the formation of sealing-lining elements. The difference is that in forming O-rings a further step is added, that being the cutting away of the flashing, i.e., the liner portion of the element. In this connection, it is preferred to maintain the flashing as thin as possible, so that when the cut is made the opposite sectors of the final O-ring having out-of-round peripheral shapes will be of minimum angular extent. However, even with fairly sizable flashings in relation to the over-all thickness of the O-ring, the resulting ring will be completely satisfactory for most static sealing applications, where the inner and outer sectors of the ring do not enter into sealing engagement with the opposed parts. It will be appreciated that with the present apparatus it is possible to produce high quality O-rings at an extremely low cost.

In view of the foregoing, a primary object of the invention is to provide novel apparatus for economically forming high quality plastic products from sheet material.

Another object of the invention is to provide novel apparatus for forming products of a predetermined shape from plastic sheet material, the products being further characterized in that a portion of the final product has a thickness greater than that of the sheet material.

A further object is to provide novel apparatus of the type described wherein plastic sheet material is continuously fed between a pair of spaced apart rollers carrying cooperating dies so as to pressure form high quality products of a predetermined shape at a production rate considerably higher than is possible by existing apparatus.

Still another object is to provide apparatus of the type described which is readily adaptable for pressure forming either thermoplastic or thermosetting material.

Another object is to provide apparatus for economically manufacturing O-ring type sealing-lining elements embodying ring portions and adapted for use with container sealing closures.

These and other objects of the invention will be better understood by referring to the following detailed description taken in conjunction with the accompanying drawings in which:

FIGURE 1 is an enlarged fragmentary perspective view of the sealing-lining element formed by the invention;

FIGURE 2 is a semi-schematic view of an illustrative system constructed in accordance with the invention;

FIGURE 3 is an enlarged fragmentary section of a typical die carried by one of the rollers, the die being shaped so as to form the element illustrated in FIGURE 1;

FIGURES 4 through 7 are enlarged fragmentary sections of the spaced apart rollers showing the cooperative dies in their relative positions and the sheet material at successive stages of the formation process;

FIGURE 8 is an elevation view of the formed sheet material showing the sealing-lining elements prior to removal from the sheet;

FIGURE 9 is a partial section of apparatus for removing the flashing portion from the O-ring;

FIGURE 10 is a fragmentary perspective view showing an O-ring formed by the apparatus of the invention;

FIGURE 11 is an enlarged fragmentary section of a modified form of die carried by one of the rollers; and FIGURE 12 is an enlarged fragmentary section of the spaced apart rollers carrying cooperative dies of the form shown in FIGURE 11 and the sheet material at the final phase of the formation process.

An illustrative system constructed in accordance with the invention for producing sealing-lining elements 10 (FIGURE 1) is shown schematically in FIGURE 2. For convenience of reference, the element 10 will be understood to include a toroidal sealing ring 11, a central liner disc 12, and a peripheral flange 13 projecting from the ring in the plane of the disc 11. Assuming initially that the element 10 is being formed from thermoplastic sheet material 14, the material is roll-fed between the opposed portions of a heater 15. During passage through the heater 15 the sheet material is softened so that it may be shaped or formed. As noted above, the temperature at which softening occurs depends, of course, upon the particular material and is approximately 250° F. for common thermoplastics such as polyethylene.

After the sheet material 14 has been heat-softened it passes between a pair of spaced apart, cylindrical rollers 16 and 17, where forming takes place. Rollers 16 and 17 are driven by any suitable means, as by motor 20, and are arranged to rotate in opposite directions, as indicated by the arrows in FIGURE 2, about parallel axes 18 and 19. The rollers 16 and 17 carry a plurality of cooperating dies 22 and 22a, respectively, shaped in accordance with the element 10. Cooperating dies 22 and 22a are arranged to be aligned coincidentally along the reference line 23 joining the axes 18 and 19 of the respective rollers. The spacing of the rollers 16 and 17, the shape of the dies and their relationship to the roller surfaces, and the formation process, are all explained in detail below.

After formation, the individual elements 10 are still an integral part of the sheet material 14, as illustrated in FIGURE 8. In order to remove the elements from the sheet, a punch press 24 is provided. Upon removal, the elements are ready for use and may be conveyed, as by the system 25, to an accumulation point. On the other hand, the scrap material, i.e., the remaining portion of the sheet material after the elements are removed, is routed to a grinder where it is prepared for extruding additional sheet material 14. Thus it will be appreciated that there is essentially no wasting of material and that the process is, accordingly, highly economical from that standpoint.

When forming elements 10 from thermosetting material, certain modifications of the above-described process are necessary. As explained above, normally, thermosetting material is formed cold, thus eliminating the necessity of preheating, and making it possible to feed the sheet material directly to the rollers 16 and 17. However, in the case of some thermosetting materials, it is desirable to preheat them, so as to facilitate forming. In this case the material is routed through the heater prior to forming. After formation by the roller-carried dies in the manner described in connection with thermoplastic material, the elements 10 are stamped from the sheet by the press 24. In the case of thermosetting material, it is then necessary to cure the elements. The curing takes place in an oven 26, the elements 10 being conveyed to the oven by the conveyer system 25. Since the elements are being cured independently of their molds, it is necessary that the curing process be such that it does not cause the elements to deform. The scrap material is routed from the punch press 24 to a grinder or the like where it is prepared for forming additional sheet material 14. It will be appreciated that it is possible to reuse this scrap material because it is not subjected to curing. As explained above, thermosetting material cannot be effectively shaped or formed after it has been cured. However, removal of the elements from the sheet prior to their curing eliminates this problem.

Since the element 10 is symmetrical on opposite sides of a central horizontal plane through the element, the cooperating dies 22 and 22a are made identical. For this reason only the die 22 on the roller 16 is described, it being understood that the same description applies to the die 22a on roller 17. Corresponding portions of the dies 22 and 22a are identified by the same numerals, with the portions of the die 22a carrying the subscript "a."

Referring to FIGURE 3, the die 22 embodies a plurality of different, but communicating, die regions that are either elevated or depressed relative to the cylindrical surface 21 of the roller 16. Relating the various die regions to the finished element 10, a central circular die region 28, corresponding to the disc 12, is elevated relative to the roller surface 21. Communicating with the central die region 28 is an annular, cylindrically-grooved region 29 which is depressed relative to the surface 21 and which corresponds to the sealing ring 11 of the element 10. Outwardly of the grooved region 29 is an annular, intermediate die region 30, which corresponds to the peripheral flange 13 of element 10, elevated relative to the surface 21 the same extent as the central die region 28. An outermost, annular die region 31 adjoins the intermediate region 30 and is elevated relative to both the roller surface 21 and the regions 28 and 30. For reasons that will become apparent, the outermost region 31 is elevated a distance less than half the thickness of the sheet material 14. It will be noted that the outermost die region 31 does not correspond to a portion of the finished element 10. This is by reason of the element being cut or stamped from the sheet material 14 at the annular line corresponding to the junction of the intermediate and outermost die regions 30 and 31. It is important to note that all the various die regions are cylindrically curved about the axis 18 of the roller 16.

In order that formation be accomplished in the desired manner, the various die regions are constructed so that the totals of volumetric displacements of the elevated and depressed die regions are substantially equal. That is to say, the total of the volumes of the central die region 28, the intermediate die region 30, and the outermost die region 31, outside the cylindrical roller surface 21, indicated by the phantom line 32, is substantially equal to the total volme of the grooved region 29 inside of that surface. For reasons that will be more fully explained, the total of the volumetric displacement of the elevated die regions 28, 30 and 31 is preferably just slightly greater than the total volumetric displacement of the depressed region.

The spacing of the roller surfaces 21 and 21a is preferably substantially equal to the thickness of the sheet material 14. Thus, when the dies 22 and 22a of the respective rollers are not acting upon the material, no forming pressure is being applied.

With the above-described structural relationships in mind, the formation process may be readily understood. The process is shown at successive stages of progress in FIGURES 4 through 7, the cooperating dies 22 and 22a being shown in their respective positions relative to the reference line 23 (between axes 18 and 19) in each of the figures.

FIGURE 4 shows the cooperating dies 22 and 22a at the positions wherein their leading edges are aligned with the reference line 23. It may be seen that the roller surfaces 21 and 21a in the region of the reference line are spaced apart a distance substantially equal to the thickness of the unaltered sheet material 14, as indicated above. In this position the dies 22 and 22a have contacted the sheet material 14, and that material which originally occupied the position now occupied by the elevated outermost die regions 31 and 31a, has been forced to the rear, i.e., to the left from the reference line 23 in FIGURE 4, into the cavities provided by the grooved regions 29 and 29a. As illustrated, the forward portions of the cavities are not completely filled at this stage of progress.

As the rollers 16 and 17 rotate to bring the cooperating dies 22 and 22a into the positions shown in FIGURE 5, the sheet material 14 is advanced and further formation takes place. The material between the opposed, intermediate die regions 30 and 30a is likewise shifted to the rear relative to the direction of movement of the sheet material into the cavities provided by the opposed, grooved die regions 29 and 29a.

In FIGURE 5, the forward portions of the grooved die regions 29 and 29a are aligned along the reference line 23, the cavities provided by these portions having been completely filled by the material from the communicating elevated regions. It should be noted that final formation or shaping takes place at a maximum pressure line coinciding with the reference line 23 by virtue of the corresponding die regions of dies 22 and 22a being closest together at that position. In this same regard there is no shaping or formation taking place ahead of the reference line or to the right thereof, as viewed in FIGURE 5, because the cylindrically curved configurations of the dies 22 and 22a cause them to begin separating from one another. On the other hand, shaping or shifting of the sheet material 14 continues to take place to the rear of the reference line 23 where the corresponding die regions are moving closer together. As illustrated in FIGURE 5, the elevated central die regions 28 and 28a cause material to build up and shift to the remaining unfilled portions of the cavities provided by the grooved die regions 29 and 29a.

FIGURE 6 illustrates the cooperating dies and the sheet material at the midpoint of the formation process. This figure further illustrates the concept of final formation taking place at the reference line. Ahead of that line the dies begin separating from the already formed portion of the element 10. Behind the reference line 23 material displaced by the central die regions 28 and 28a is moved into and partially fills the cavities provided by the trailing portions of the grooved die regions 29 and 29a. It should be noted that there is not only longitudinal movement of material taking place to the rear of the reference line 23, but also lateral movement. This lateral movement is essential in order that the side portions (not shown) of the grooved die regions 29 and 29a be filled with material.

In FIGURE 7, the trailing portions of the grooved die regions 29 and 29a are in positions of alignment with the reference line 23. As illustrated, the trailing portions of the intermediate die regions 30 and 30a and the outermost die regions 31 and 31a are in pressural contact with the sheet material 14 during this last phase of formation. The material displaced by these last-mentioned elevated die regions is moved to the right, as viewed in FIGURE 7, to completely fill the remaining unfilled portions of the grooved die regions. This is not to say that such material movement is ahead or to the right of the reference line 23. Once the grooved die regions have moved to the right of the reference line, there is no further movement or shaping of material, as discussed above.

As noted above, the total of the volumetric displacements of the elevated die regions is preferably just slightly greater than the total displacement of the depressed die regions. This relationship is preferred by reason of the necessity of the grooved die regions 29 and 29a being completely filled with material prior to the instant that the trailing portions of the elevated die regions are aligned with the reference line 23. In other words, as the dies 22 and 22a move from the positions shown in FIGURE 7 to the position where the trailing edge of the outermost die regions 31 and 31a are aligned with the reference line 23, the material displaced cannot be shifted into the grooved die regions as they have moved to the right of the reference line 23. This small amount of material is taken up in the sheet material between elements 10 by virtue of tolerances in the rollers or by shifting the material laterally to slightly increase the width of the sheet material 14.

A slightly modified die 50, illustrated in FIGURE 11, includes means for removing the elements 10 from the sheet material 14 during the formation process. Such a die is desirable for the reason that it eliminates the need for the punch press 24 for performing that function, and thereby reduces the cost of the products. The die 50 comprises, in series, a central, circular region 51, an annular, cylindrically grooved region 52, an intermediate region 53, and annular cutter region 54. For reasons that will be explained, the cutter region 54 is elevated above the phantom line 32 (extension of the rollers surface 21) a distance substantially equal to half the thickness of the sheet material 14.

It should be noted that the basic difference between the previously described die 22 and the die 50 is that the former embodies the outermost region 31, whereas the latter embodies the cutter region 54. However, as in the case of the die 22, there is preferably a substantially equal relationship between the totals of volumetric displacements of the elevated die regions 51, 53, and 54 and the depressed region 52 of die 50.

The formation process accomplished by means of a pair of identical, cooperating dies 50 and 50a is essentially the same as that described in connection with dies 22 and 22a. Material is displaced by the elevated die regions into the cavity provided by the depressed die region. Referring to FIGURE 12, which illustrates the final phase of the formation process, the cutter die regions 54 just contact each other at the reference line 23, where final formation of the element 10 takes place. Because of this contact, the element 10 is separated from the surrounding sheet material 14, thus eliminating the need for a punch press.

In order to form an O-ring per se, the disc 12 and the flange 13 are simply cut away, leaving the ring 40 shown in FIGURE 10. Apparatus for accomplishing this cut may conveniently comprise a pair of opposed dies 41 and 42, as illustrated in FIGURE 9. Alternately, dies may be constructed and arranged in a manner similar to dies 50 and 50a, whereby removal of the rings 40 from the sheet material is accomplished during the formation process. Relative to the first method, the dies 41 and 42 are shaped in accordance with the element to be cut and are adapted for movement toward and away from one another. The die 41 carries a pair of spaced cutter blades 43 arranged to cut away the disc and flange immediately adjacent their junctions with the ring. The resulting ring 40 has small out-of-round portions or sectors 44 in the areas where the cuts are made. However, as discussed above, these sectors are relatively small as compared to the over-all ring 40 and, further, they are not located so as in any way to impair the effectiveness of the sealing ring in most applications.

It will be understood that the dies 41 and 42 may be incorporated as elements of the punch press 24 in the system described above. In this case, the rings 40 are removed from the sheet material 14 immediately following the forming operation by the rollers 16 and 17. Thus, irrespective of whether rings 40 or elements 10 are being formed, the scrap material may be reused.

It will be appreciated that there is provided an economical apparatus for pressure forming high quality plastic products and, more specifically, for manufacturing O-ring type sealing-lining elements and O-rings per se.

The apparatus of the invention is a substantial improvement over existing apparatus because of there being virtually no possibility of trapping air during formation of the configurated product. As the cooperating dies advance in the manner described, air is continually forced out behind the rollers. The improved apparatus not only results in uniformly high quality products, but also materially reduces labor costs. The reduction in costs stems from the fact that the necessity of inspecting each individual part is eliminated because of the uniform quality.

As previously explained, the apparatus also lends itself to economical production from the standpoint of rendering possible conservation of material. In addition, the continuous nature of the rolling operation makes possible a high production rate. Moreover, the production rate may be further increased by providing a plurality of rows of staggered dies on each of the rollers. For example, FIGURE 8 shows sheet material which has been formed by rollers carrying two rows of staggered dies.

As stated above, the apparatus of the invention achieves the actual shifting of material so as to build up the thickness of the original sheet in certain areas, while reducing it a corresponding amount in adjoining areas. The appartus has potential widespread application in this regard. For instance, asymmetrical parts of various sizes and shapes, including those of a continuous nature, as compared to the individual, illustrative elements, may be advantageously formed. Further, by passing the sheet material through a series of roller pairs it is possible to form a product of a predetermined shape having a material thickness many times greater than that of the original sheet material.

Although the certain details of the invention have been shown and described with a high degree of particularity, it will be understood that this was for illustrative purposes and that various changes may be made without departing from the spirit and scope of the invention.

We claim:

1. Apparatus for forming a flat sheet of plastic material into individual configurated elements, comprising: a pair of rollers arranged for rotation in opposite directions about parallel axes and with their wall surfaces spaced apart a distance substantially equal to the thickness of said sheet material; means for rotating said rollers; and a plurality of dies on one of said rollers shaped in accordance with the desired shapes of said elements and spaced from one another and disposed in generally side by side relation around the periphery of its roller, each of said dies having different, but communicating die regions elevated and depressed relative to the cylindrical wall surface of its roller, the totals of the volumetric displacements of said elevated and depressed regions being substantially equal.

2. Apparatus for forming a flat sheet of plastic material into individual configurated elements, comprising: a pair of substantially identical rollers arranged for rotation in opposite directions at the same angular velocity about parallel axes and with their cylindrical wall surfaces spaced apart a distance substantially equal to the thickness of said sheet material; means for rotating said rollers as aforesaid; and a plurality of dies on each of said rollers shaped in accordance with the desired shape of said elements and spaced from one another and arranged generally in a plurality of side by side rows extending substantially around the entire periphery thereof, cooperating pairs of said dies being aligned coincidentally along a reference line extending between said axes during said rotation, each of said dies having different, but communicating die regions elevated and depressed relative to the cylindrical wall surface of its associated roller, the totals of the volumetric displacements of said elevated and depressed regions being substantially equal.

3. Apparatus for forming a flat sheet of plastic material into individual configurated elements, comprising: a pair of rollers arranged for rotation in opposite directions about parallel axes and with their cylindrical wall surfaces spaced apart a distance substantially equal to the thickness of said sheet material; means for rotating said rollers; a plurality of dies on at least one of said rollers shaped in accordance with the desired shapes of said elements and separated from one another by portions of the cylindrical wall surface of the associated roller, each of said dies having communicating die regions elevated and depressed relative to the cylindrical wall surface of its roller, the totals of the volumetric displacements of said elevated and depressed regions being substantially equal.

4. Apparatus for forming a flat sheet of plastic material into individual configurated elements, comprising: a back up member; a cylindrical roller arranged for rotation about an axis parallel to the surface of said back up member and with its cylindrical wall surface spaced from the surface of said back up member a distance substantially equal to the thickness of said sheet material; means for rotating said roller; a plurality of dies on said roller shaped in accordance with the desired shapes of the individual configurated elements and disposed in spaced apart relation around said roller, each of said dies having adjacent die regions elevated and depressed relative to the cylindrical wall surface of said roller, the totals of volumetric displacements of said elevated and depressed regions being substantially equal.

References Cited in the file of this patent

UNITED STATES PATENTS

| 303,804 | Cable | Aug. 18, 1884 |
| 315,262 | Elliott | Apr. 7, 1885 |
| 1,080,647 | McKay | Dec. 9, 1913 |
| 1,988,787 | Fowler | Jan. 22, 1935 |
| 2,976,575 | Daubenberger | Mar. 28, 1961 |

FOREIGN PATENTS

| 419,189 | Italy | Mar. 17, 1947 |
| 1,117,832 | France | Mar. 5, 1956 |